US012403756B2

(12) United States Patent
Vreede (10) Patent No.: US 12,403,756 B2
(45) Date of Patent: Sep. 2, 2025

(54) REAR AXLE WITH INTEGRATED ELECTRIC MOTOR

(71) Applicant: DAF Trucks N.V., Eindhoven (NL)

(72) Inventor: Robert Jacobus Vreede, Geldrop (NL)

(73) Assignee: DAF Trucks N.V., Eindhoven (NL)

( * ) Notice: Subject to any disclaimer, the term of this patent is extended or adjusted under 35 U.S.C. 154(b) by 321 days.

(21) Appl. No.: 18/037,264

(22) PCT Filed: Nov. 16, 2021

(86) PCT No.: PCT/NL2021/050702
§ 371 (c)(1),
(2) Date: May 16, 2023

(87) PCT Pub. No.: WO2022/108444
PCT Pub. Date: May 27, 2022

(65) Prior Publication Data
US 2024/0001748 A1 Jan. 4, 2024

(30) Foreign Application Priority Data
Nov. 17, 2020 (NL) ..................................... 2026916

(51) Int. Cl.
*B60K 1/00* (2006.01)
*B60K 11/02* (2006.01)
(52) U.S. Cl.
CPC ................ *B60K 1/00* (2013.01); *B60K 11/02* (2013.01); *B60K 2001/001* (2013.01);
(Continued)
(58) Field of Classification Search
CPC ................ B60K 1/00; B60K 2001/001; B60Y 2200/142; B60Y 2410/10
See application file for complete search history.

(56) References Cited

U.S. PATENT DOCUMENTS 6,820,707 B1 * 11/2004 Cantemir ................ B60T 1/062
180/65.6
11,828,353 B1 * 11/2023 Gianone ................... F16H 3/54
(Continued)

FOREIGN PATENT DOCUMENTS

CN 205070668 U 3/2016
CN 107554265 A 1/2018
(Continued)

OTHER PUBLICATIONS

International Search Report and Written Opinion—PCT/NL2021/050702—mailing date May 27, 2022.

*Primary Examiner* — Erez Gurari
(74) *Attorney, Agent, or Firm* — Banner & Witcoff, Ltd.

(57) ABSTRACT

A truck, comprising a rear axle, comprising a motor housing extending laterally between rear wheels of the truck, and an electric motor and power transmission coaxially aligned in said motor housing and arranged for driving the rear wheels; and a suspension system, for suspending the rear axle to a chassis of the truck, said suspension system at least comprising a pair of springs and shock absorbers, and an anti-roll stabilizer and a guiding rod linkage for allowing movement in a vertical direction relative to the chassis; wherein the motor housing is limited by a minimum vertical ground clearance between the road surface and a bottom surface of the motor housing; wherein the motor housing comprises a reinforced central top section providing a guiding rod mount for pivotally mounting the guiding rod linkage to the rear axle; wherein the motor housing further comprises suspension yokes integrated into the housing and extending on either side of the motor housing near both axial ends, said suspension yokes providing spring mounts and shock absorber mounts for mounting said opposed pair of springs and shock absorbers, wherein the motor housing comprises a rear section outer surface provided with connectors, to (Continued)

provide input ports to the electric motor and wherein said connectors are provided in an orientation to guide one or more high voltage power cables adjacent the rear section outer surface in a vertical upward direction.

15 Claims, 7 Drawing Sheets

(52) U.S. Cl.
CPC ..... *B60Y 2200/142* (2013.01); *B60Y 2410/10* (2013.01); *B60Y 2410/115* (2013.01)

(56) References Cited

U.S. PATENT DOCUMENTS

| | | | |
|---|---|---|---|
| 2004/0060750 A1* | 4/2004 | Chernoff | B60G 17/0195 180/65.1 |
| 2013/0220718 A1 | 8/2013 | Gotou et al. | |
| 2019/0054816 A1 | 2/2019 | Garcia et al. | |
| 2021/0006137 A1 | 1/2021 | Hoshinoya et al. | |
| 2021/0162873 A1* | 6/2021 | Yu | B62D 21/02 |
| 2021/0323393 A1* | 10/2021 | Kontermann | B60K 1/00 |
| 2022/0281302 A1* | 9/2022 | Massari | B60K 17/165 |
| 2023/0010068 A1* | 1/2023 | Davis | B60K 1/02 |
| 2023/0406095 A1* | 12/2023 | Rossia | B60K 1/02 |
| 2024/0001748 A1* | 1/2024 | Vreede | B62D 21/11 |
| 2024/0352989 A1* | 10/2024 | Palermo | H02K 7/02 |
| 2025/0050726 A1* | 2/2025 | Barillot | B60K 1/02 |

FOREIGN PATENT DOCUMENTS

| | | |
|---|---|---|
| DE | 19953864 A1 | 5/2000 |
| DE | 102011113198 A1 | 3/2013 |
| DE | 102016004367 A1 | 2/2017 |
| EP | 2991889 B1 | 11/2018 |
| EP | 3789218 A1 | 3/2021 |
| WO | 2014045708 A1 | 3/2014 |
| WO | 2017114418 A1 | 7/2017 |
| WO | 2019012194 A1 | 1/2019 |

\* cited by examiner

REAR AXLE WITH INTEGRATED ELECTRIC MOTOR

CROSS-REFERENCE TO RELATED APPLICATIONS

This application is a U.S. National Stage application under 35 U.S.C. § 371 of International Application PCT/NL2021/050702 (published as WO 2022/108444 A1), filed Nov. 16, 2021, which claims the benefit of priority to Application NL 2026916, filed Nov. 17, 2020. Benefit of the filing date of these prior applications is hereby claimed. Each of these prior applications is hereby incorporated by reference in its entirety.

DESCRIPTION OF THE PRIOR ART

The transformation from diesel powered heavy commercial vehicles to electric powered heavy electric vehicles brings many challenges, one of which is the integration of modules for powering an electric vehicle into the conventional truck architecture.

To propel an electric powered vehicle, the electric motor or electric motors are new components to be packaged in the vehicle. Architectural concepts include placing the electric motor and transmission in the chassis, e.g. on the spot where the internal combustion engine is located. In contrast to conventional trucks the driven axle may instead powered by an internal electric motor resulting in a compact design where an electric powertrain can have all of the functions of a conventional powertrain embedded in a single body, also known as an E-axle. Typically, the E-axle receives its energy from an electric power source, e.g. a battery pack or fuel cells, located elsewhere in the truck and connected through one or multiple power cables.

DE102016004367 describes a rigid axle driven by an electric drive having a suspension for an axle with an electric motor and gearbox arranged in alignment with one another. Air bellows supports extend transversely to the driven axle and are attached to a housing of the gearbox.

Publication EP2991889 describes another approach to integrating modules for powering an electric vehicle into a truck architecture. A chassis component is disclosed for carrying a load applied to the vehicle, such as a fifth wheel, which is distributed to the wheels of the vehicle. A hollow space in the chassis component can be used for housing an electrical drive unit and a power transmission. The chassis component may function as a complete suspension component for connecting the wheels to the chassis. However, the increased load characteristics of the chassis component relative to a that of a conventional truck, would require design modifications to the suspension setup.

For configurations in which the E-axle is directly attached to the wheels of the truck, the E-axle moves with respect to the electric power source while the truck is driving. With this concept the conventional rear axle setup and power transmission can be conserved.

However, to allow for relative movement of the electric motor, the power cable should also bend or deflect with the movement of the E-axle. This deflection can cause a durability problem due to an inherent fatigue limit of the power cable.

Considering various road surface conditions, e.g. bumps and holes, and load conditions of the driven axle, e.g. cornering, accelerating, braking and trailer load distribution, this poses a significant challenge for trucks with E-axles, with respect to power cabling fatigue issues.

There is a need for further improvement with regards to cable supports in trucks, that alleviate these or other problems.

SUMMARY OF THE INVENTION

In one aspect, it is aimed to provide a truck comprising a rear axle and a suspension system. The rear axle comprises a motor housing extending laterally between rear wheels of the truck. The rear axle further comprises an electric motor and power transmission coaxially aligned in said motor housing and arranged for driving the rear wheels. The suspension system suspends the rear axle to a chassis of the truck, and at least comprises a pair of springs and shock absorbers, and an anti-roll stabilizer and a guiding rod linkage for allowing movement in a vertical direction relative to the chassis. The motor housing is limited by a minimum vertical ground clearance between the road surface and a bottom surface of the motor housing. The motor housing comprises a reinforced central top section providing a guiding rod mount for pivotally mounting the guiding rod linkage to the rear axle. The motor housing further comprises suspension yokes integrated into the housing and extending on either side of the motor housing near both axial ends. The suspension yokes provide spring mounts and shock absorber mounts for mounting said opposed pair of springs and shock absorbers. The motor housing comprises a rear section outer surface provided with connectors, to provide input ports to the electric motor. The connectors are provided in an orientation to guide one or more high voltage power cables adjacent the rear section outer surface in a vertical upward direction. For the high voltage cables, the upward vertical orientation will minimize the bending stresses induced by the axle suspension movement.

Said connectors are thus provided with an orientation to guide the one or more high voltage cables in upward direction minimize fatigue stress, since high voltage cable connectors typically are provided from low resistance metals, e.g. copper or copper alloys, that are susceptible to bending stress. The one or more high voltage cables electrically connects the electric power source to the E-axle. To further alleviate bending stress, a support beam may form a mechanical support structure to lead the power cable along a cable path extending between a chassis mount and an E-axle mount. The support beam may comprise one or more bending stiffness elements, forming a stiffness of the support beam that is highest in a middle section and that decreases towards the chassis mount and the E-axle mount, evenly distributing the bending stress in the support beam along the cable path when the E-axle moves relative to the chassis, to further prevent local fatigue failure of the power cable.

In some embodiments, the support beam may extend from a chassis mount in a backward direction along a longitudinal member of the chassis and connects the E-axle mount along a vertical direction, to said a rear section outer surface provided with connectors, to provide input ports to the electric motor.

In some embodiments, an electrically conductive core may be mounted between the chassis mount and the E-axle connector, to make a ground connection between the E-axle and the chassis and the support beam may be mounted to the conductive core along at least a part of the cable path, e.g. to form an electrically insulating sleeve with a bending stiffness that varies along the cable path.

In other or further embodiments, the support beam comprises bending stiffness elements comprising one or more flanges extending along the cable path. The flanges may have a flange height that is highest in the middle section of the support beam and that decreases towards the chassis mount and the E-axle mount. In one embodiment, the bending stiffness elements may comprise two vertically extending flanges forming an H-beam to prevent the support beam from deflecting in a lateral direction.

In yet further embodiments, the support beam comprises laterally extending cable supports arranged for leading multiple power cables adjacent the cable path, each power cable following the cable path at a lateral offset from the support beam. The multiple power cables may be connected to the E-axle by a common power connector, at a distance beyond the E-axle mount to allow disconnecting the power cables without disassembling the support beam from the E-axle mount.

In some embodiments, on each axial end of the motor housing, an anti-roll mount of an anti-roll stabilizer, an opposing pair of spring mounts and a shock absorber mount lie on a common plane perpendicular to a centerline of the rear wheels of the truck. The anti-roll stabilizer may comprise a torsion shaft. The torsion shaft is mounted to the chassis while allowing an axial rotation at an offset to the rear axle, and has a pair of linkage plates on both ends extending from the torsion shaft towards the anti-roll mounts. The anti-roll stabilizer is configured such that a roll movement of the truck, causing a difference in a vertical displacement of the anti-roll mounts on each axial end of the motor housing relative to the chassis, is counteracted by a torsional stiffness of the torsion shaft.

In other or further embodiments, the guiding rod linkage comprises a pair of guiding rods. The pair of guiding rod is pivotally mounted to the chassis at an offset to the rear axle, and extends towards the reinforced central top section.

In some embodiments, the reinforced central top section of the motor housing comprises a number of ribs. The ribs converge toward the guiding rod mount and have a rib height that is highest near the guiding rod mount and that decreases away from the guiding rod mount.

Additionally, or alternatively, housing extensions are coaxially connected to both axial ends of the motor housing for mounting rear wheel brakes. The housing extensions have a proximal base part that is axially connected to the motor housing, and have a distal part extending away from the motor housing toward the rear wheels with a diameter smaller than the proximal base part.

In some embodiments, the motor housing comprises a rear section outer surface provided with connectors, to provide input ports to the electric motor. In a further embodiment, the connectors are provided in an orientation to guide one or more high voltage power cables adjacent the rear section outer surface in a vertical upward direction.

Additionally or alternatively, the motor housing may be arranged for internally carrying a gearbox and/or inverter for powering different groups of coils of the electric motor.

In some embodiments, the motor housing is made of an electrically conductive material to electromagnetically shield at least the electric motor. Additionally or alternatively, the motor housing is made of a thermally conductive material to passively cool e.g. the electric motor or the power transmission.

In yet further embodiments, the rear axle is provided with an internal cooling circuit for circulating coolant fluid through the axle housing and one or more coolant hose connectors on the rear section outer surface for receiving one or more coolant hoses, to actively cool at least the electric motor. The coolant fluid may additionally be employed as lubricant for lubricating rotating parts inside the motor housing, such as the power transmission.

BRIEF DESCRIPTION OF THE DRAWINGS

The invention will be further elucidated in the figures.

DETAILED DESCRIPTION

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1:
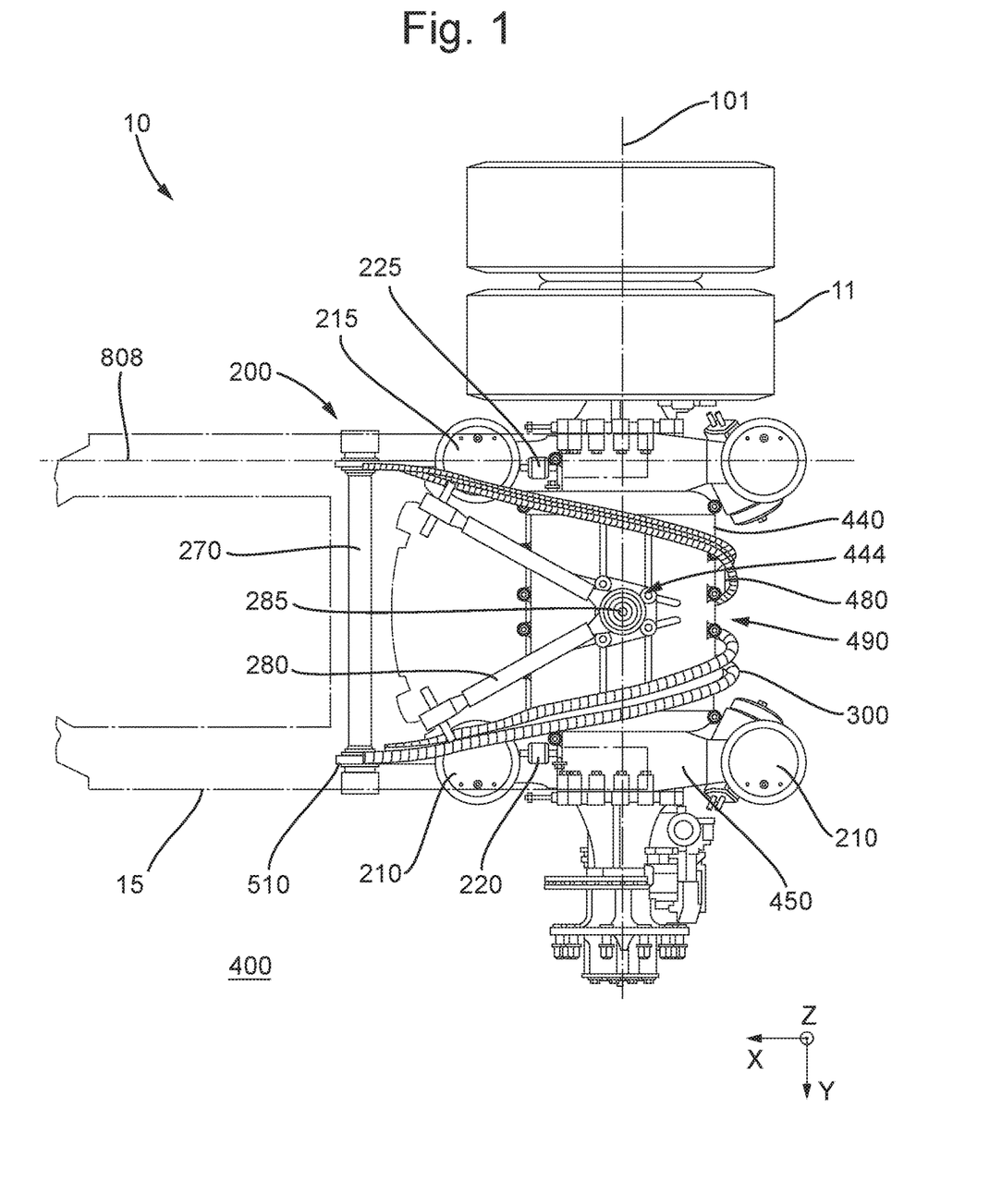
FIG. 1 shows a top view of a truck with a rear axle with integrated electric motor according to a first embodiment.
Figure 6:
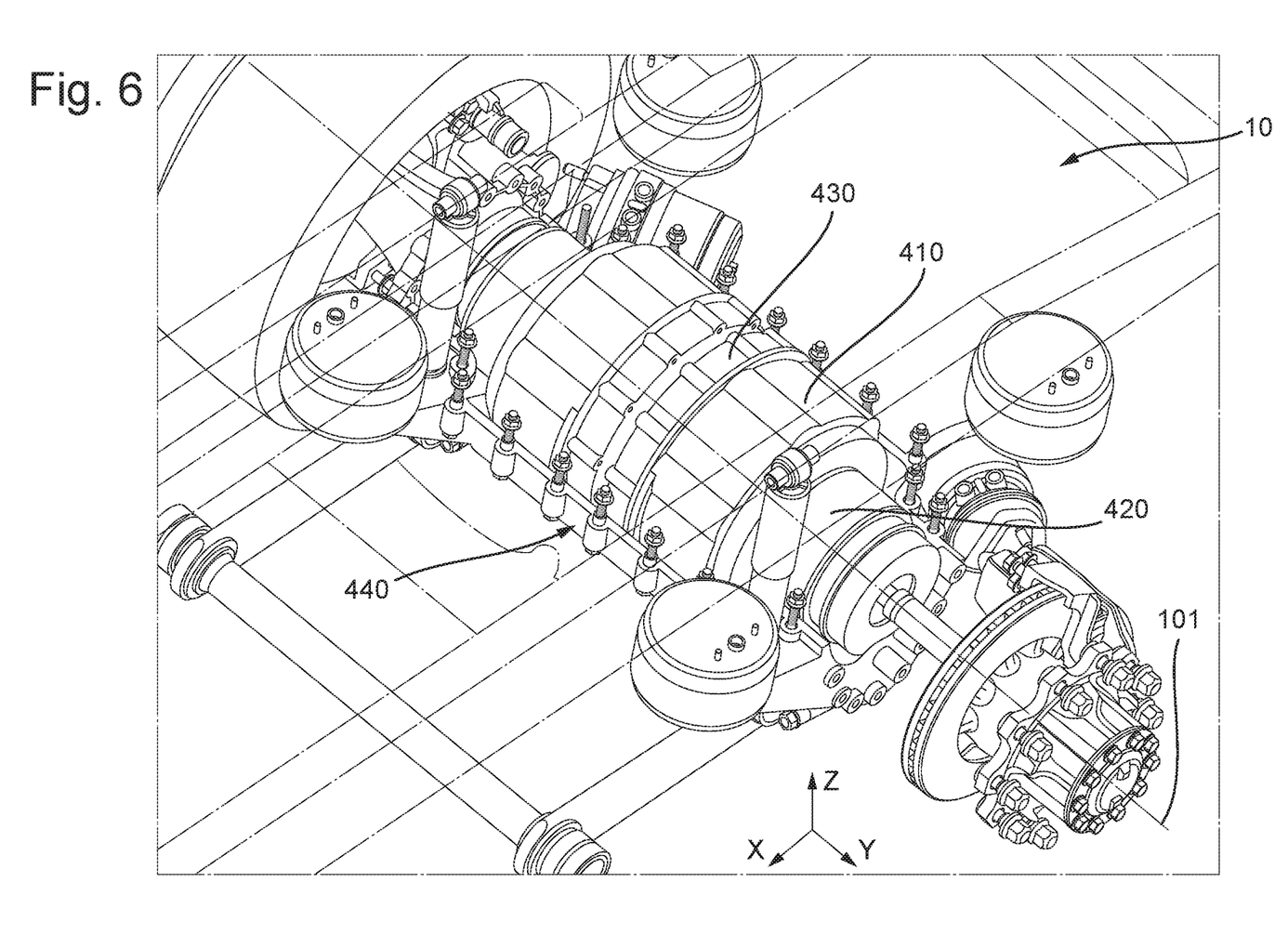
FIG. 6 provides an exploded view of yet another or further embodiment of the truck.

FIG. 1 shows a top view of a truck 10 with a rear axle 400 with integrated electric motor according to a first embodiment. The rear axle 400 comprises a motor housing 440 extending laterally between rear wheels 11 of the truck 10. As shown in FIG. 6, the rear axle 400 comprises an electric motor 410 and power transmission 420, coaxially aligned in said motor housing 440 and arranged for driving the rear wheels 11. For example, the rear axle can comprise two electric motors 410 and corresponding power transmissions 420, each arranged for driving the rear wheels 11 on one side of the truck 10, whereas the electric motors 410 are oriented back to back. This setup allows independent (electronic) control of the torque to the rear wheels 11 on each side of the truck 10. Alternatively, a single electric motor 410 and power transmission 420 can be used to simultaneously drive the rear wheels 11 on both sides of the truck 10, e.g. by having a hollow shaft electric motor and power transmission 420. In case of a single electric motor 410, the corresponding power transmission 420 may comprise a controllable differential drive or planetary gear system to mechanically divide the drive torque between the rear wheels 11 on each side.

Turning back to FIG. 1, the truck 10 further comprises a suspension system 200, for suspending the rear axle 400 to a chassis 15. The suspension system 200 at least comprises a pair of springs 210 and shock absorbers 220, and an anti-roll stabilizer 270 and a guiding rod linkage 280 for allowing movement in a vertical direction Z relative to the chassis 15. In more detail with reference to FIG. 4, the motor housing 440 is limited by a minimum vertical ground clearance DH between the road surface 5 and a bottom surface of the motor housing 440. The minimum vertical ground clearance DH may be at least fifteen centimeters. Preferably, the minimum vertical ground clearance is between fifteen and 25 centimeters.

FIG. 1 shows that the motor housing 440 comprises a reinforced central top section 444 providing a guiding rod mount 285 for pivotally mounting the guiding rod linkage 280 to the rear axle 400. The motor housing 440 further comprises suspension yokes 450 integrated into the housing. The suspension yokes 450 extend on either side of the motor housing 440 near both axial ends, and provide spring mounts 215 and shock absorber mounts 225 for mounting the opposed pair of springs 210 and shock absorbers 220. As can be seen in the figure, a rear section 490 is provided on the motor housing 440, provided with connectors 480 to provide input ports to the electric motor.

Figure 2:
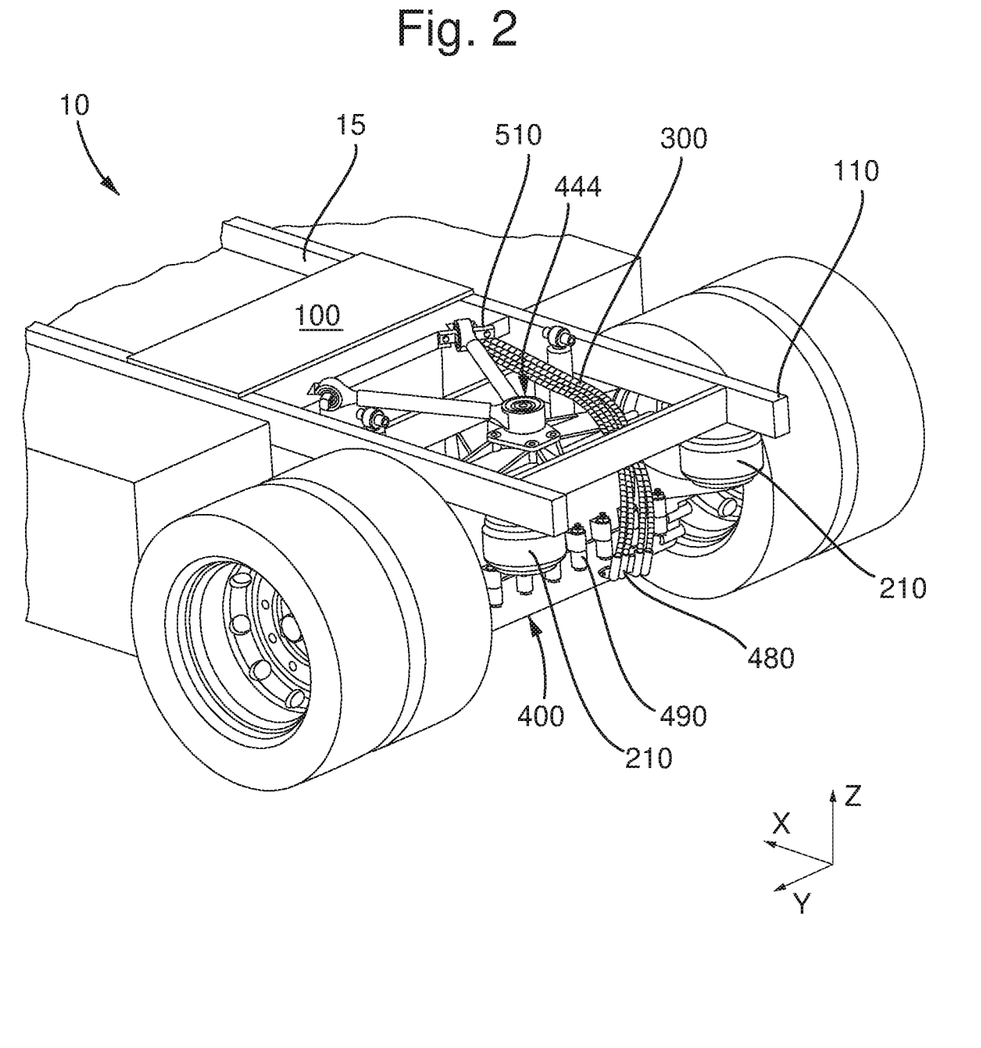
FIG. 2 shows a further embodiment of a truck with one or more high voltage cables.

Referring to FIG. 2 a further embodiment of a truck 10 is depicted with one or more high voltage cables 300. Preferably, the high voltage cables 300 extend from chassis mount 510 in a backward (−X) direction along a longitudinal member 15 of the chassis, and approach the connectors 480 along the vertical (−Z) direction. The benefit of this configuration, is that the length of the power cables 300 can be made as long as possible within the given length of the truck 10, which reduces the movement amplitude per centimeter of cable when the E-axle 400 moves relative to the chassis 100. By having the high voltage cables 300 extend along a longitudinal member 15 of the chassis 100, e.g. on an inside surface of the longitudinal member 110, the power cables can be shielded inside the chassis 100 against dirt, damage, and electromagnetic emission.

Preferably, the rear section outer surface 490 is easily accessible from the bottom of the truck, e.g. for service or maintenance. Preferably, the rear section outer surface 490 is a surface on a rear half, more preferably a rear bottom quadrant of the E-axle.

Most preferably, the connectors are provided in an orientation to guide one or more high voltage power cables 300 adjacent the rear section outer surface 490 in a vertical upward direction +Z. For example, the connectors can be provided on a rear section outer surface 490 which is substantially flat and smooth, so that power cables 300 can closely be guided upward along the E-axle 400. The connectors on the rear section outer surface 490 can e.g. be straight connectors oriented outward, while the connectors 480 on the power cables 300 are right-angle connectors 480, or vice versa. Alternatively, the rear section outer surface 490 may for example be oriented relatively upward or perpendicular to the outer surface of the E-axle, so that straight connectors can be used on the rear section outer surface 490 and on the power cables 300.

Figure 3:
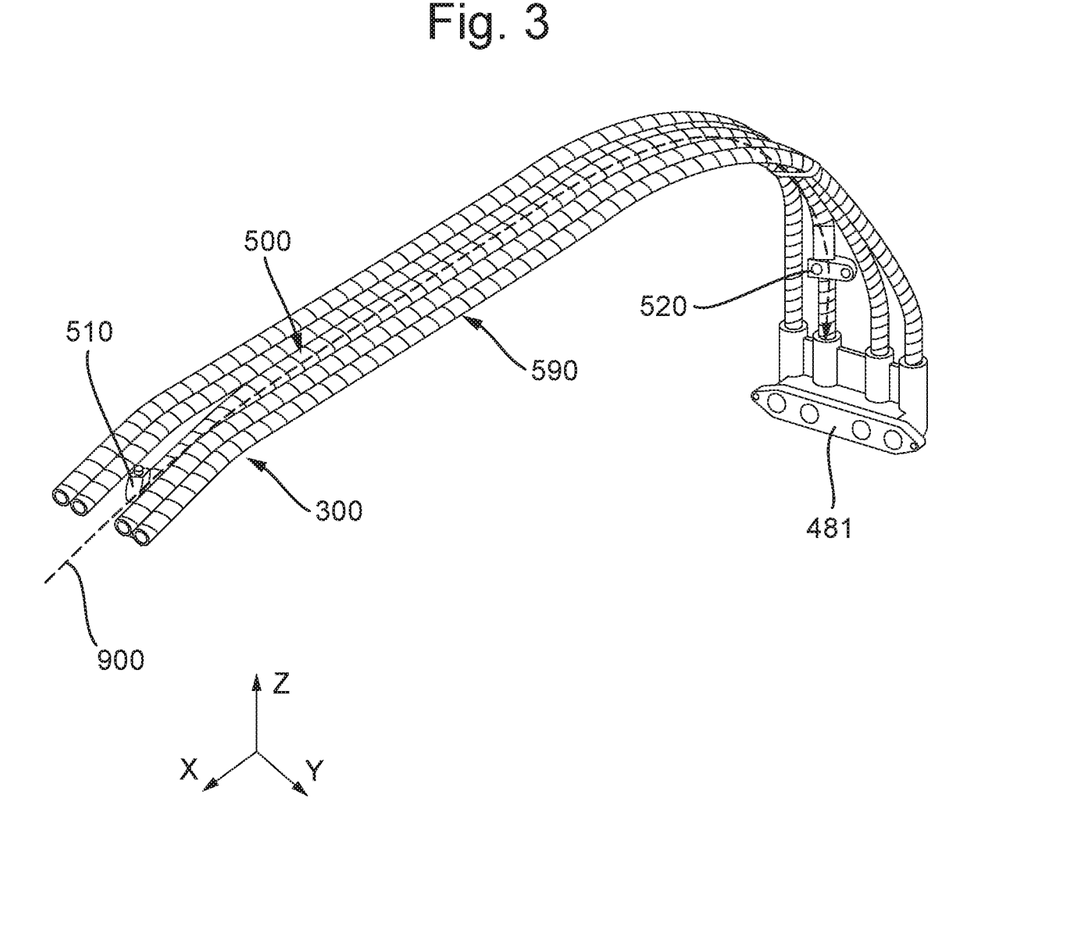
FIG. 3 shows a perspective view on a support beam for a high voltage cable.

FIG. 3 provides an embodiment of a support beam 500, comprising bending stiffness elements extending along the cable path. In the embodiment of FIG. 3, three typical areas can be distinguished along the cable path 900: (i) Starting at the chassis mount 510, the support beam comprises a chassis end section, which extends horizontally in the −X direction from the chassis mount 510. As the distance to the chassis mount 510 increases, the bending stiffness of the support beam 500 increases as well. (ii) Next, the support beam 500 transitions into a middle section, in which the bending stiffness of the support beam 500 reaches a maximum. (iii) Going towards the E-axle mount 520 provided at a rear section outer surface of the E-axle, an end section approaches the E-axle mount 520 vertically in the −Z direction along the cable path. Similar to the chassis end section, the bending stiffness of the E-axle end section is lower towards the E-axle mount 520 and increases as the distance thereto is increased. The cable may be connected to the support beam 500 by lateral mounting elements 590.

Additionally, in the configuration as shown in FIG. 3, the vertical orientation of the E-axle end section increases the (vertical) bending stiffness of that section of the support beam 500. This may allow the absolute length of the E-axle end section to be longer than the chassis end section. The stiffness of the support beam 500 can be relatively less sensitive to the distance between the chassis mount 510 and E-axle mount 520 in the vertical direction Z, than to the distance between the chassis mount 510 and E-axle mount 520 in the horizontal direction X. By having a support beam 500 that approaches the E-axle mount 520 vertically in the −Z direction along cable path 900, a longer length of power cable 400 can be supported by a less sensitive support beam 500, which improves spreading the total movement of the power cable 400 equally along the cable path 900.

Figure 4:
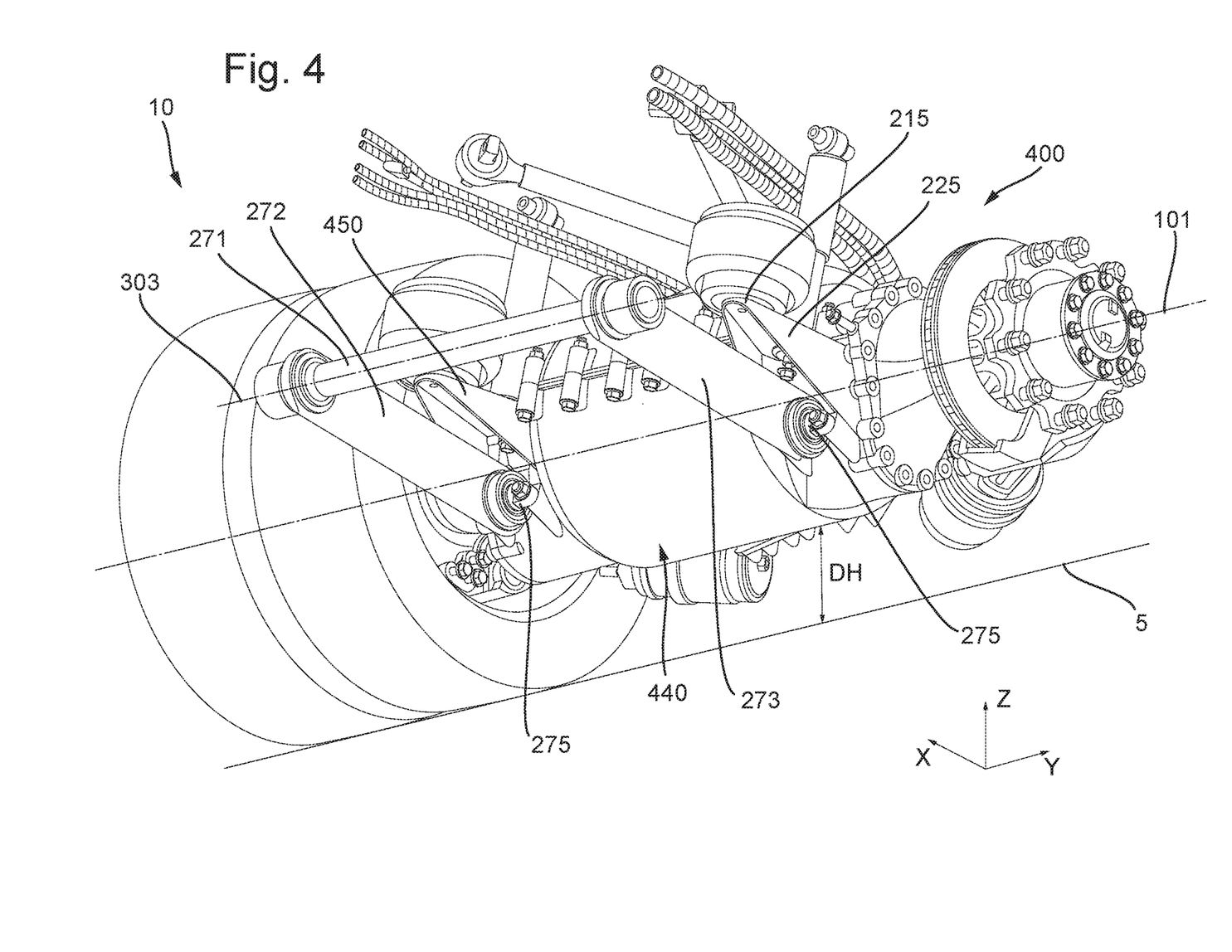
FIG. 4 provides an isometric bottom view of a further embodiment of the truck.

Referring to FIG. 4, the suspension yokes 450 further provide anti-roll mounts 275 on a bottom section of the motor housing 440 near both axial ends to mount the anti-roll stabilizer 270 to the rear axle 400.

Back to FIG. 1, on each axial end of the motor housing 440 the anti-roll mount 275, the opposing pair of spring mounts 215 and the shock absorber mount 225 lie on a common plane 808 perpendicular to a centerline 101 of the rear wheels 11 of the truck 10.

The potential benefit of having the mounts 275, 215, 225 on a common plane 808 is, that reaction forces on the motor housing 440 caused by interaction of the rear axle 400 with the suspension system 300 are concentrated in a single plane 808, which with topology optimization, may lead to significant weight reduction of the rear axle 400.

Preferably, the suspension yoke 450 is coaligned with plane 808 and designed to bear all corresponding suspension loads on the motor housing 440, while other parts of the motor housing are largely unloaded and can therefore be relatively thin-walled or light-weight. A rear axle 400 with integrated electric motor 410 and power transmission 420 could have comparable weight as a conventional driven axle.

The compact size of the electric motor 410 and transmission 420 allows placing them in between the wheels, coaxial with the centerline 101 of the rear wheels 11. This eliminates the need for an angled drive mechanism, and therefore reduces the total weight of the rear axle 400. It is a challenge, however, to integrate the electric rear axle 400 into a conventional truck architecture without significantly changing the dynamic properties of the truck 10.

The current solution proposes to integrate carrying and driving functions into the rear axle 400. Driving functions are e.g. provided by the driveshafts, the wheel hubs with their bearings, the wheels and tires. The carrying functions are for example provided by the motor housing 440, where on conventional trucks a rigid driven axle is used. The suspension system 200 with springs 210 and shock absorbers 220, together with the guiding rod linkage 280 and anti-roll stabilizer 270 are other examples of carrying functions. The rear axle assembly is typically fitted with brakes between the driving and carrying components.

To reduce the total weight of the rear axle 400, integration of the suspension yokes 450 that support the springs 210 into the motor housing 440 can provide a considerable weight reduction, saving the weight connections with clamping plates and U-bolts which are typically used in a conventional driven axle. Integration of the guiding rod mount 285 into the motor housing 440 may bring a weight reduction as well. The shape of the proposes motor housing 440 provides an opportunity to save weight in the mounting of the brakes as well. A conservative estimation indicates a weight saving of at least fifty kilograms with respect to a conventional driven axle with the measures above.

FIG. 4 provides an isometric view of a further embodiment of the truck 10, wherein the anti-roll stabilizer 270 comprises a torsion shaft 271 which is mounted to the chassis (not shown) while allowing an axial rotation at an offset to the rear axle 400. The torsion shaft 271 has a pair of linkage plates 272, 273 on both ends extending towards the anti-roll mounts 275. In the anti-roll stabilizer configuration as described, a roll movement of the truck 10, causing a difference in a vertical displacement of the anti-roll mounts 275 on each axial end of the motor housing 440 relative to the chassis 15, is counteracted by a torsional stiffness of the torsion shaft 271.

Preferably, the linkage plates 272, 273 are rigidly connected to the ends of the torsion shaft 271 and extend perpendicularly to the axis of rotation 303 of the torsion shaft 271 towards the anti-roll mounts 275. Preferably, the linkage plates 272, 273 have equal length, so that the torsion shaft 271 is mounted parallel to the rear axle 400, such that the rear axle 400 is suspended to the chassis as part of a parallelogram mechanism comprising the anti-roll stabilizer and the guiding rod linkage, allowing a movement of the rear axle 400 in vertical direction Z, while other degrees of freedom of the rear axle 400 are constrained.

The anti-roll stabilizer may comprise e.g. planar bearings, roller bearings or ball bearings on the ends of the torsion shaft 271 to mount the torsion shaft 271 to the chassis 15 while allowing axial rotation. Alternatively, the bearings can be mounted on a central section of the torsion shaft 271 between the linkage plates 272, 273 to mount the torsion shaft 271 to the chassis 15 while allowing axial rotation.

Preferably, the linkage plates 272, 273 are pivotally mounted to the anti-roll mounts 275 on the motor housing 440. For example, the connection between the linkage plates 272, 273 and the anti-roll mounts may comprise planar bearings, ball bearings, or roller bearings.

Alternatively, the linkage plates 272, 273 can be rigidly connected to the motor housing 440 or may be an integral part of the suspension yokes 450, or the torsion shaft 271 or entire anti-roll stabilizer 270 can be mounted at a different location or orientation to create a suspension system with alternative kinematics and dynamics. However, the reaction forces on the motor housing 440 caused by interaction of the rear axle 400 with the suspension system 300 may still be concentrated in a single plane 808, as long as the anti-roll mount, the opposing pair of spring mounts 215 and the shock absorber mount 225 lie on a common plane 808 perpendicular to the centerline 101 of the rear wheels 11 of the truck 10.

Figure 5:
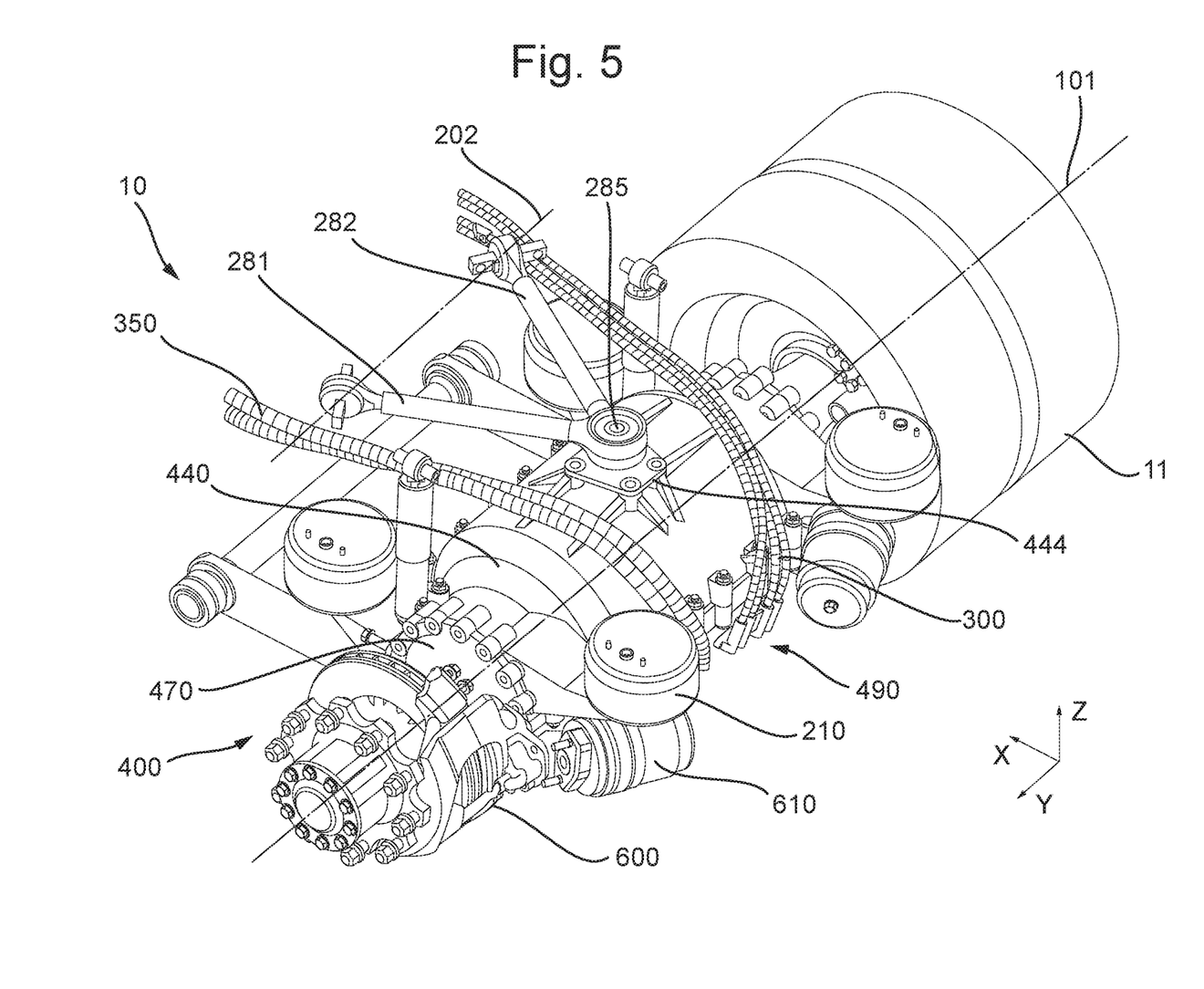
FIG. 5 provides an isometric top view of another further embodiment of the truck.

FIG. 5 provides an isometric view of another further embodiment of the truck 10, wherein the guiding rod linkage 280 comprises a pair of guiding rods 281, 282. The pair of guiding rods 281, 282 are pivotally mounted to the chassis (not shown) at an offset to the rear axle 400, and extend towards the reinforced central top section 444. Preferably, the guiding rods 281, 282 have an equal length. The pair of guiding rods 281, 282 can for example be mounted between the rear axle 400 and the chassis, such that the rear axle 400 is suspended to the chassis as part of a parallelogram mechanism comprising the guiding rod linkage and the anti-roll stabilizer, allowing a movement of the rear axle 400 in vertical direction Z, while other degrees of freedom of the rear axle 400 are constrained.

For example, the pair of guiding rods 281, 282 may form a V-shape, with the ends of the guiding rods that are mounted to the chassis spread along a common axis of rotation 202, and the ends of the guiding rods that are mounted to the rear axle 400 converging toward the guiding rod mount 285. Alternatively, the pair of guiding rods 281, 282 can have a V-shape of which the converging end is mounted to the chassis, and the other ends are mounted to the motor housing 440, near the axial ends, or to the suspension yokes 450.

In some preferred embodiments, the diverging ends of the V-shaped pair of guiding rods 281, 282 is mounted to the suspension yokes together with the anti-roll mount, the opposing pair of spring mounts 215 and the shock absorber mount 225 on a common plane 808 perpendicular to a centerline 101 of the rear wheels 11 of the truck 10. This may provide optimal distribution of reaction forces on the rear axle 400, caused by interaction with the suspension system while the truck is driving, which with topology optimization, may lead to further weight reduction of the rear axle 400.

In a preferred embodiment, the reinforced central top section 444 of the motor housing 440 comprises a number of ribs converging toward the guiding rod mount 285 and having a rib height that is highest near the guiding rod mount 285 and that decreases away from the guiding rod mount 285. Preferably, the rib height is aligned with the vertical direction Z, such that the vertical bending stiffness of the reinforced central top section 444 is increased. By having a number of ribs converge toward the guiding rod mount 285, this can provide the guiding rod mount 285 with reinforced stiffness in all degrees of freedom. The ribs can e.g. be an integral part of the motor housing or be separately assembled parts.

Alternatively, the reinforced central top section 444 is provided by the motor housing 440 having a larger wall thickness near the guiding rod mount 285. However, compared to the embodiment with ribs, this may lead to a higher overall weight of the motor housing 440. Alternatively, the reinforced central top section 444 can be provided by the motor housing 440 having an internal wall structure supporting the central top section. For example, the motor housing 440 may comprise a central wall that axially splits the rear axle into two opposite compartments, each housing components for driving wheels on one side of the truck 10. Accordingly, the central wall may serve as a support wall to reinforce the central top section 444.

In yet further embodiments, housing extensions 470 are coaxially connected to both axial ends of the motor housing 440 for mounting rear wheel brakes 600. The housing extensions 470 have a proximal base part that is axially connected to the motor housing 440, and have a distal part extending away from the motor housing 440 toward the rear wheels 11 with a diameter smaller than the proximal base part. For example, the housing extensions 470 can be conical, horn shaped, or comprise a stepped outer surface.

Alternatively, the housing extensions 470 are brackets connecting the rear wheel brakes 600 to the motor housing 440. Alternatively, the housing extensions 470 can be an integral part of the motor housing 440, or the motor housing 440 can provide surfaces for directly mounting the rear wheel brakes 600. By integrating the suspension yokes 450 into the rear axle 400 the brake cylinders 610 can be moved to a lower position compared to a conventional truck, e.g. to a position below the springs 210 as shown in FIG. 6. This, in turn, enables locating the springs 210 closer to the centerline 101 of the rear axle, which reduces the length of the suspension yokes 450 and chassis 15, and thus the total weight of the truck 10. Having a short length of suspension yokes 450 in relation to the other dimensions of the rear axle 400 makes it feasible to integrate the suspension yokes 450 with the motor housing 440, e.g. manufactured as a cast component.

In some preferred embodiments, the motor housing 440 comprises a rear section outer surface 490 provided with connectors 480, to provide input ports to the electric motor (not shown). Preferably, the rear section outer surface 490 is easily accessible from the bottom of the truck, e.g. for service or maintenance. Preferably, the rear section outer surface 490 is a surface on a rear half, more preferably a rear bottom quadrant of the motor housing 440. In case of more than one connector, these are preferably provided parallel to the centerline 101 of the rear wheels, to have equal bending behavior of the cables to be connected to the connectors 480 through a mating cable connector 481.

Most preferably, the connectors 480 are provided in an orientation to guide one or more high voltage power cables 300 adjacent the rear section outer surface 490 in a vertical upward direction +Z. For example, the connectors 480 can be provided on a rear section outer surface 490 which is substantially flat and smooth, so that power cables 300 can closely be guided upward along the motor housing 440. The connectors 480 on the rear section outer surface 490 can e.g. be straight connectors 480 oriented outward, while the cable connectors 481 of the power cables 300 are right-angle connectors, or vice versa. Alternatively, the rear section outer surface 490 may for example be oriented relatively upward or perpendicular to the outer surface of the motor housing 440, so that straight connectors 480 can be used on the rear section outer surface 490 and on the power cables 300.

FIG. 6 provides an exploded view of yet another or further embodiment of the truck 10, wherein the motor housing 440 is additionally arranged for internally carrying a gearbox and/or inverter 430 for powering different groups of coils of the electric motor 410. Preferably, the gearbox and/or inverter 430 is coaxially aligned with the electric motor 410 and the power transmission 420. For example, the gearbox and/or inverter 430 can placed behind the electric motor 410 relative to the power transmission 420, in a central section of the motor housing 440.

The electric motor 410 and power transmission 420 fit into the cavity inside the motor housing 440. Considering the potential weight savings that could be realized on the rear axle assembly, there may be a weight budget to integrate a gearbox and/or inverter 430 into the rear axle 400 as well. This could bring advantages in the cable connections from the invertor 430 to the electric motor 410. The invertor 430 is connected to the electric motor 410 by multiple cables to power different groups of coils. By having an invertor 430 placed close to the electric motor 410 the cables can be short, and since they are located inside the motor housing 440, problems with electromagnetic radiation due to the alternating current can be limited by applying EMC shielding measures to the motor housing 440.

In a preferred embodiment, the motor housing 440 is made of an electrically conductive material to electromagnetically shield at least the electric motor 410. In this way, the motor housing 440 can form a Faraday cage around the internally carried electric components to reduce emission of and susceptibility to electromagnetic radiation, which may be required for performance and reliability of the truck, or to comply to industry specific technical regulations. For example, the motor housing 440 can be made of cast iron, steel, or an aluminum alloy.

Alternatively, the motor housing 440 is made of an electrically non-conductive material, such as a plastic, but has an electrically conductive element adjacent the inner or outer surface of the motor housing 440, such as a conductive paint or a separate conductive mesh structure forming a Faraday cage around the internally carried components.

Preferably, the motor housing 440 is made of a thermally conductive material with a thermal conductivity of at least ten Watt per meter Kelvin to passively cool e.g. the electric motor 410. For example, the thermal conductivity of the motor housing 440 can be between ten and seventy Watt per meter Kelvin for steel motor housings 440, between thirty and one hundred Watt per meter Kelvin for (cast) Iron motor housings 440, or between seventy and two hundred and forty Watt per meter Kelvin for Aluminum (alloy) motor housings 440.

In other or further preferred embodiments, the rear axle 400 is provided with an internal cooling circuit for circulating coolant fluid through the motor housing 440 and one or more coolant hose connectors on the rear section outer surface 490 for receiving one or more coolant hoses 350, to actively cool at least the electric motor 410. For example, the motor housing 440 may comprise internal walls adjacent the internally carried components, such as the electric motor 410. Accordingly, the internal walls can have channels for circulating coolant fluid through the motor housing 440 close to the source of heat.

Alternatively or additionally, the external walls of the motor housing 440 may comprise channels for coolant fluid. Alternatively, a separate element comprising an internal cooling circuit, such as a heat sink or other type of heat exchanger, can be built into or onto the motor housing.

Alternatively, the motor housing may comprise sealed compartments having a defined inlet and outlet, each compartment housing a component such as an electric motor or a power transmission, and being supplied with a flow of coolant fluid.

Preferably, the coolant hoses are fluidly connected to an external pump and reservoir containing coolant fluid, which is pumped to and from the rear axle 400. The rear axle cooling system may be part of a larger truck cooling system, cooling other parts on the truck 100 as well to reduce the total weight of the truck 10.

Alternatively, the rear axle 400 may comprise its own independent cooling system, e.g. if the cooling capacity required for cooling the rear axle 400 cannot be matched with that of other parts of the truck 10.

Preferably, the coolant fluid is additionally employed as lubricant for lubricating rotating parts inside the motor housing 440 such as the power transmission 420, to avoid requiring separated flows of lubricant and coolant fluid, and thus reduce the total weight of the truck 10.

Figure 7A:
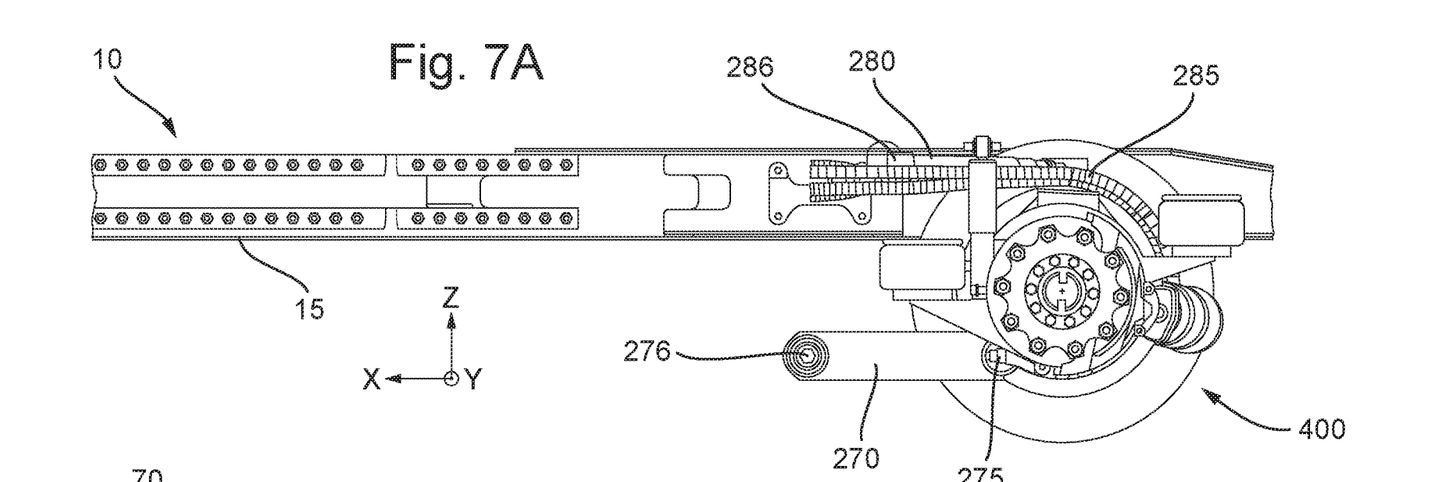
FIG. 7A provides a side view of a truck comprising an electric rear axle.
Figure 7B:
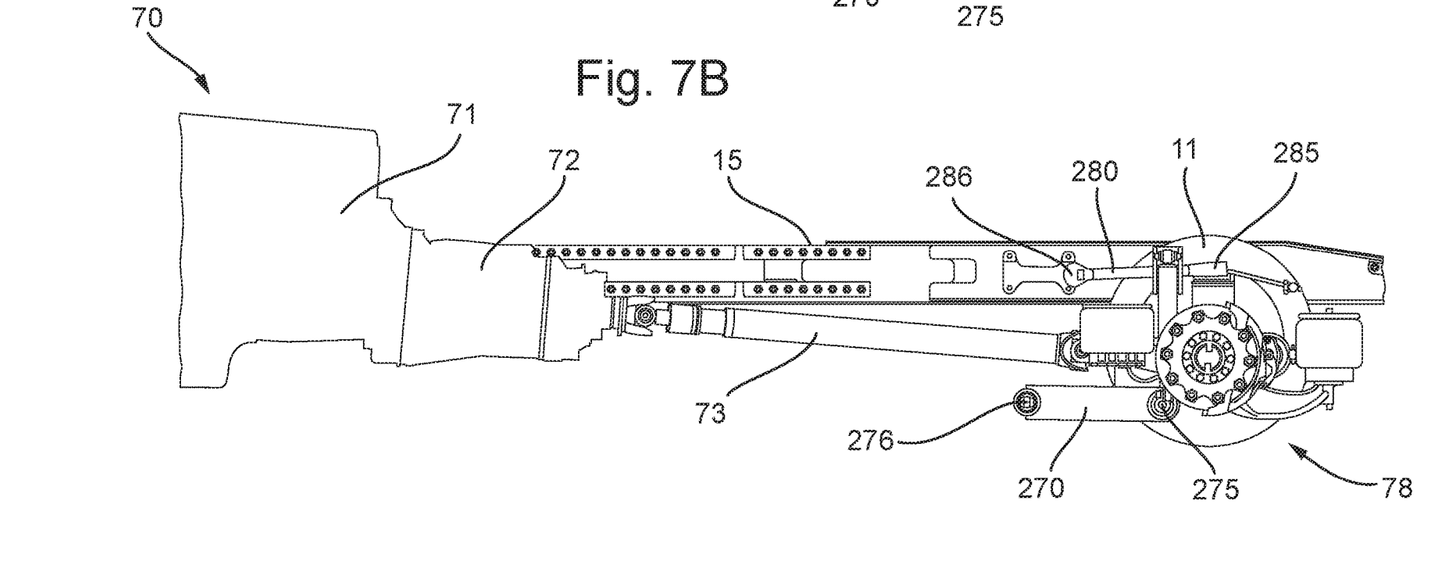
FIG. 7B provides a side view of a conventional truck architecture.

FIG. 7A provides a side view of a truck 10 comprising an electric rear axle 400. In comparison, FIG. 7B provides a side view of a conventional truck 70 architecture, comprising an internal combustion engine 71, a power transmission 72 and propshaft 73, driving the rear wheels 11 of the truck through a conventional driven axle 78. The conventional driven axle 78 and electric rear axle 400 can be mounted to the chassis 15 by the same guiding rod linkage 280, and at the same chassis mount 286 and guiding rod mount 285. In both architectures, the anti-roll stabilizer 270 can have the same dimensions, orientation, and mounts 275 and 276. This facilitates integration of electric rear axle 400 into conventional truck architecture 70. Because of the obsolescence of a moving propshaft 73, in an electric rear axle 400 (see FIG. 5) the torsion shaft 271 of the anti-roll stabilizer can be placed at a more advantageous location between chassis mounts 276 compared to the conventional driven axle 78, which may benefit manufacturability and serviceability.

For suspension kinematics and secondary torques due to roll of the truck 10, it can be an advantage to have a short distance in the X direction between the anti-roll mounts 275 and the centerline 101 of the rear wheels 11. In the conventional driven axle 78 the torsion shaft is preferably located between or near mounts 275. When the same anti-roll stabilizer layout would be integrated into an electric rear axle 400, the relatively bulkier shape of the motor housing 440 would force the torsion shaft 271 forward in X-direction. A more forward mounted torsion shaft implies a larger distance in X-direction between the anti-roll mounts 275 and the centerline 101 of the rear axle 400 as well, with negative effects on kinematics and secondary torque on the axle.

The inventive solution is to flip the anti-roll stabilizer 270 over one hundred and eighty degrees along the Z-direction before mounting it to the rear axle 400. As shown in FIG. 5, this implies that the torsion shaft 271 is mounted to the chassis 15 and the linkage plates 272, 273 are mounted to the anti-roll mounts 275 on the rear axle 400. The function of the anti-roll stabilizer 270 is thereby kept similar to one on a conventional driven axle 78.

The invention claimed is:

1. A truck, comprising:
a rear axle, comprising a motor housing extending laterally between rear wheels of the truck, and an electric motor and power transmission coaxially aligned in said motor housing and arranged for driving the rear wheels; and
a suspension system, for suspending the rear axle to a chassis of the truck, said suspension system at least comprising a pair of springs and shock absorbers, and an anti-roll stabilizer and a guiding rod linkage for allowing movement in a vertical direction relative to the chassis;
wherein the motor housing is limited by a minimum vertical ground clearance between the road surface and a bottom surface of the motor housing;
wherein the motor housing comprises a reinforced central top section providing a guiding rod mount for pivotally mounting the guiding rod linkage to the rear axle;
wherein the motor housing further comprises suspension yokes integrated into the housing and extending on either side of the motor housing near both axial ends, said suspension yokes providing spring mounts and shock absorber mounts for mounting said opposed pair of springs and shock absorbers, wherein the motor housing comprises a rear section outer surface provided with connectors, to provide input ports to the electric motor and wherein said connectors are provided in an orientation to guide one or more high voltage power cables adjacent the rear section outer surface in a vertical upward direction.

2. The truck according to claim 1, further comprising a support beam, forming a mechanical support structure to lead the power cable along a cable path extending between a chassis mount and an E-axle mount.

3. The truck according to claim 2, wherein the support beam further comprises an electrically conductive core, mounted between the chassis mount and the E-axle mount, to make a ground connection between the E-axle and the chassis.

4. The truck according to claim 2, wherein the support beam is mounted to the conductive core along at least a part of the cable path.

5. The truck according to claim 2, wherein the support beam comprises one or more bending stiffness elements, forming a stiffness of the support beam that is highest in a middle section and that decreases towards the chassis mount and the E-axle mount, evenly distributing the bending stress in the support beam along the cable path when the E-axle moves relative to the chassis, to prevent local fatigue failure of the power cable.

6. The truck according to claim 5, wherein the bending stiffness elements comprise vertically extending flanges to prevent the support beam from deflecting in a lateral direction.

7. The truck according to claim 1, wherein said suspension yokes further provide anti-roll mounts to mount the anti-roll stabilizer to the rear axle and wherein the anti-roll stabilizer comprises a torsion shaft, said torsion shaft being mounted to the chassis while allowing an axial rotation at an offset to the rear axle, and having a pair of linkage plates on both ends extending from the torsion shaft towards the anti-roll mounts, such that a roll movement of the truck, causing a difference in a vertical displacement of the anti-roll mounts on each axial end of the motor housing relative to the chassis, is counteracted by a torsional stiffness of the torsion shaft.

8. The truck according to claim 1, wherein the guiding rod linkage comprises a pair of guiding rods, said pair of guiding rods being pivotally mounted to the chassis at an offset to the rear axle, and extending towards the reinforced central top section.

9. The truck according to claim 1, wherein the reinforced central top section of the motor housing comprises a number of ribs converging toward the guiding rod mount and having a rib height that is highest near the guiding rod mount and that decreases away from the guiding rod mount.

10. The truck according to claim 1, wherein housing extensions are coaxially connected to both axial ends of the motor housing for mounting rear wheel brakes, said housing extensions having a proximal base part that is axially connected to the motor housing, and having a distal part extending away from the motor housing toward the rear wheels with a diameter smaller than the proximal base part.

11. The truck according to claim 1, wherein the motor housing is additionally arranged for internally carrying a gearbox and/or inverter for powering different groups of coils of the electric motor.

12. The truck according to claim 1, wherein the motor housing is made of an electrically conductive material to electromagnetically shield at least the electric motor.

13. The truck according to claim 1, wherein the motor housing is made of a thermally conductive material with a thermal conductivity of at least ten Watt per meter Kelvin.

14. The truck according to claim 1, wherein the rear axle is provided with an internal cooling circuit for circulating coolant fluid through the motor housing and one or more coolant hose connectors on the rear section outer surface for receiving one or more coolant hoses, to actively cool at least the electric motor.

15. The truck according to claim 14, wherein the coolant fluid is additionally employed as lubricant for lubricating rotating parts inside the motor housing.

* * * * *